(12) United States Patent
Bledsoe et al.

(10) Patent No.: US 9,753,679 B2
(45) Date of Patent: Sep. 5, 2017

(54) PRINTER WITH SELECTABLE CAPABILITIES

(71) Applicant: Marvell International Technology Ltd., Hamilton (BM)

(72) Inventors: James D Bledsoe, Albany, OR (US); Gregory F Carlson, Corvallis, OR (US); Todd A McClelland, Corvallis, OR (US); Patrick A McKinley, Corvallis, OR (US)

(73) Assignee: Marvell International Technology Ltd, Hamilton (BM)

( * ) Notice: Subject to any disclaimer, the term of this patent is extended or adjusted under 35 U.S.C. 154(b) by 87 days.

(21) Appl. No.: 14/326,331

(22) Filed: Jul. 8, 2014

(65) Prior Publication Data
US 2015/0002886 A1    Jan. 1, 2015

Related U.S. Application Data

(63) Continuation of application No. 13/784,406, filed on Mar. 4, 2013, now Pat. No. 8,786,871, which is a continuation of application No. 10/826,738, filed on Apr. 16, 2004, now Pat. No. 8,400,645.

(51) Int. Cl.
*G06F 3/12* (2006.01)
*H04N 1/00* (2006.01)

(52) U.S. Cl.
CPC ............ *G06F 3/123* (2013.01); *G06F 3/1203* (2013.01); *G06F 3/1224* (2013.01); *G06F 3/1253* (2013.01); *G06F 3/1285* (2013.01); *H04N 1/00973* (2013.01)

(58) Field of Classification Search
CPC .......... G06F 8/65; G06F 3/1292; G07F 17/26; H04N 1/00137; H04N 1/00143; H04N 1/00169
USPC .............................. 358/1.15, 1.13
See application file for complete search history.

(56) References Cited

U.S. PATENT DOCUMENTS

| | | |
|---|---|---|
| 5,321,749 A | 6/1994 | Virga |
| 5,532,920 A | 7/1996 | Hartrick et al. |
| 5,580,177 A | 12/1996 | Gase et al. |
| 5,581,358 A | 12/1996 | Seto et al. |
| 5,654,901 A | 8/1997 | Boman |
| 5,844,691 A | 12/1998 | Nishiyama et al. |
| 5,857,088 A * | 1/1999 | Keith ................... G06F 9/30072 341/65 |
| 5,878,256 A | 3/1999 | Bealkowski et al. |
| 5,917,615 A | 6/1999 | Reifman et al. |
| 6,098,038 A * | 8/2000 | Hermansky ......... G10L 21/0208 704/226 |
| 6,429,953 B1 | 8/2002 | Feng |
| 6,449,055 B1 | 9/2002 | Okimoto et al. |
| 6,467,087 B1 | 10/2002 | Yang |
| 6,618,162 B1 | 9/2003 | Wiklof et al. |
| 6,665,453 B2 | 12/2003 | Scheurich |

(Continued)

*Primary Examiner* — Akwasi M Sarpong

(57) ABSTRACT

A system comprising a processor and a memory comprising firmware is provided. The firmware is executable by the processor to cause the processor to operate a print mechanism in accordance with a first state associated with a capability of the print mechanism, change the first state associated with the capability to a second state in response to receiving first information from an external interface, and operate the print mechanism in accordance with the second state associated with the capability.

4 Claims, 4 Drawing Sheets

(56) References Cited

U.S. PATENT DOCUMENTS

| | | | |
|---|---|---|---|
| 6,775,023 B1 | 8/2004 | Fukunaga et al. | |
| 6,950,205 B2 | 9/2005 | Takeo | |
| 7,051,019 B1 | 5/2006 | Land et al. | |
| 7,107,210 B2* | 9/2006 | Deng | G10L 21/0208 704/226 |
| 7,158,268 B2 | 1/2007 | Boyd | |
| 7,231,369 B2 | 6/2007 | Hirabayashi | |
| 7,249,353 B2 | 7/2007 | Zarco | |
| 7,318,086 B2 | 1/2008 | Chang et al. | |
| 7,664,486 B2 | 2/2010 | Noguchi | |
| 8,285,344 B2* | 10/2012 | Kahn | H03G 3/32 361/56 |
| 8,639,502 B1* | 1/2014 | Boucheron | G10L 21/02 381/94.1 |
| 2001/0034747 A1* | 10/2001 | Fujitani | G07F 17/26 715/234 |
| 2002/0041394 A1 | 4/2002 | Aoki | |
| 2002/0063889 A1 | 5/2002 | Takemoto et al. | |
| 2002/0067504 A1* | 6/2002 | Salgado | G06F 9/4411 358/1.15 |
| 2002/0097408 A1 | 7/2002 | Chang et al. | |
| 2002/0097433 A1 | 7/2002 | Chang et al. | |
| 2002/0140966 A1* | 10/2002 | Meade, II | G06F 9/4415 358/1.15 |
| 2002/0163665 A1 | 11/2002 | Iwata et al. | |
| 2002/0167679 A1 | 11/2002 | Nims et al. | |
| 2002/0186408 A1 | 12/2002 | Nakaoka et al. | |
| 2003/0020952 A1 | 1/2003 | Iida | |
| 2003/0058471 A1 | 3/2003 | Okubu | |
| 2003/0063305 A1* | 4/2003 | McIntyre | G06K 15/00 358/1.13 |
| 2003/0112461 A1 | 6/2003 | Ogura | |
| 2003/0131072 A1 | 7/2003 | Kobayashi | |
| 2003/0220734 A1 | 11/2003 | Harrison | |
| 2004/0046998 A1 | 3/2004 | Ito | |
| 2004/0095607 A1 | 5/2004 | Walmsley et al. | |
| 2004/0174561 A1 | 9/2004 | Fukunaga et al. | |
| 2004/0174570 A1 | 9/2004 | Plunkett et al. | |
| 2004/0210894 A1* | 10/2004 | Zarco | G06F 8/65 717/171 |
| 2005/0052664 A1 | 3/2005 | Ferlitsch | |
| 2005/0149481 A1 | 7/2005 | Hesselink et al. | |
| 2005/0262437 A1 | 11/2005 | Patterson et al. | |
| 2007/0006150 A9 | 1/2007 | Walmsley | |
| 2007/0177180 A1* | 8/2007 | Yamada | H04N 1/00931 358/1.13 |
| 2009/0290718 A1* | 11/2009 | Kahn | H03G 3/32 381/57 |
| 2011/0261983 A1* | 10/2011 | Claussen | H04R 25/505 381/317 |
| 2013/0262101 A1* | 10/2013 | Srinivasan | G10L 21/0208 704/226 |

\* cited by examiner

PRINTER WITH SELECTABLE CAPABILITIES

RELATED APPLICATIONS

This application is a continuation application of U.S. patent application Ser. No. 13/784,406 (now U.S. Pat. No. 8,786,871), which is a continuation of U.S. patent application Ser. No. 10/826,738, filed Apr. 16, 2004, the entirety of both of which are hereby incorporated by reference herein for all purposes.

BACKGROUND

Printers and multi-function devices perform various functions for users. These functions may include printing, faxing, and/or scanning text and images. The price of these devices is often based on level of performance and features of a particular device. For example, a device that includes facsimile and scanning functions in addition to printing functions may be priced higher than a device that includes only printing functions. Similarly, a device that performs printing functions at a higher speed or resolution may be priced higher than a device that performs printing functions at a lower speed or resolution.

A user may purchase a printer or multi-function device with a certain set of features based on the user's present and future needs. Because the set of features of a printer or multi-function device is generally not alterable, the user may have the choice of purchasing a printer or multi-function device that either meets some but not all of the user's needs at a lower price or meets all of the user's needs but has features that a user does not need at a higher price. In addition, the user's needs may change over time such that the user may desire an increased or a decreased set of features of the printer or multi-function device. In many cases, the user may need to purchase a different printer or multi-function device to accommodate the user's changed needs. It would be desirable for a user to be able to purchase a printer or multi-function device that closely met the user's needs both at the time or purchase and over time.

SUMMARY

In an exemplary embodiment, the present disclosure provides a system comprising a processor and a memory comprising firmware. The firmware is executable by the processor to cause the processor to operate a print mechanism in accordance with a first state associated with a capability of the print mechanism, change the first state associated with the capability to a second state in response to receiving first information from an external interface, and operate the print mechanism in accordance with the second state associated with the capability.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

In embodiments herein below, a printer with selectable capabilities is shown and described. The printer provides a user with the ability to select and enable certain capabilities of the printer in conjunction with a server. The capabilities may include performance capabilities such as increased print speed or resolution, upgrade capabilities such as software or hardware upgrades, functional capabilities such as enabling a facsimile or scanner function, and renewal capabilities such as enabling expired or used-up features. In response to receiving a request for a particular capability from a user, the server may collect payment information associated with the capability prior to enabling the capability in the printer.

Figure 1:
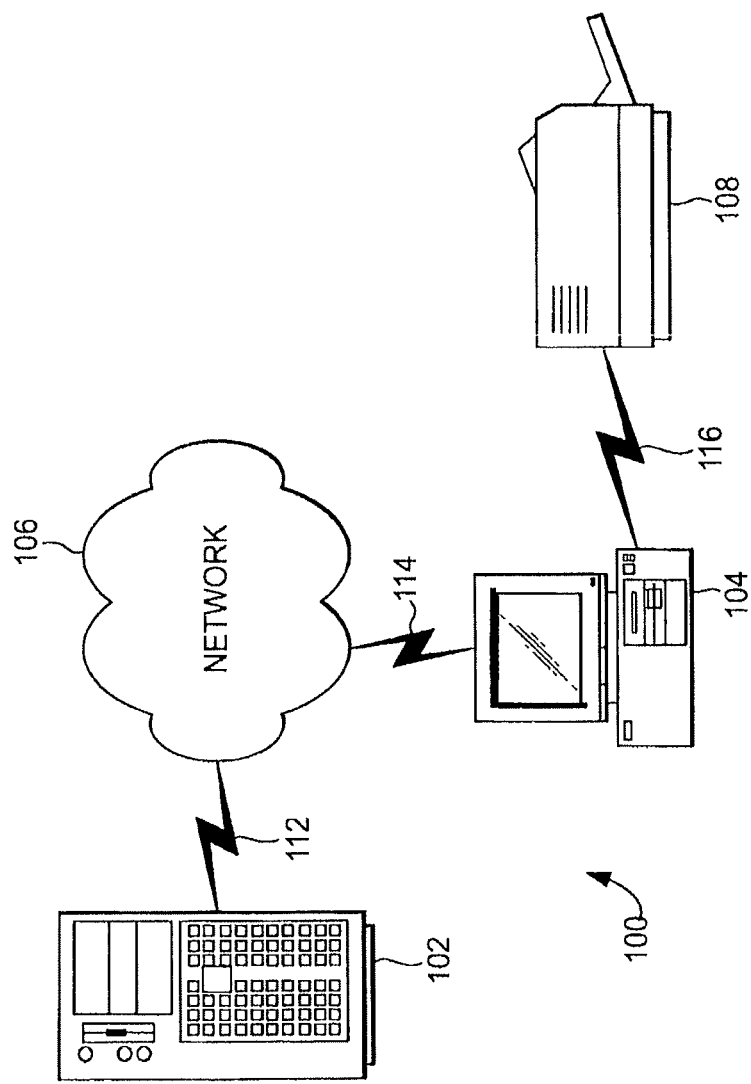
FIG. 1 is diagram illustrating an embodiment of a system that includes a printer with selectable capabilities.

FIG. 1 is diagram illustrating an embodiment of a system 100 that includes a printer 108 with selectable capabilities. System 100 comprises a server 102, a computer system 104, a network 106, and printer 108. Server 102 is coupled to network 106 using a connection 112, computer system 104 is coupled to network 106 using a connection 114, and printer 108 is coupled to computer system 104 using a connection 116. Connections 112, 114, and 116 may each be any type of wired or wireless connection, and connections 112, 114, and 116 may each include any number of intermediate connections (not shown).

Server 102 comprises any suitable computer system configured to provide information to computer system 104 in response to requests from computer system 104 using network 106. Network 106 comprises any suitable communications network such as a global communications network, e.g., the Internet. Computer system 104 communicates with network 106 using connection 114 and with printer 108 using connection 116.

Figure 2:
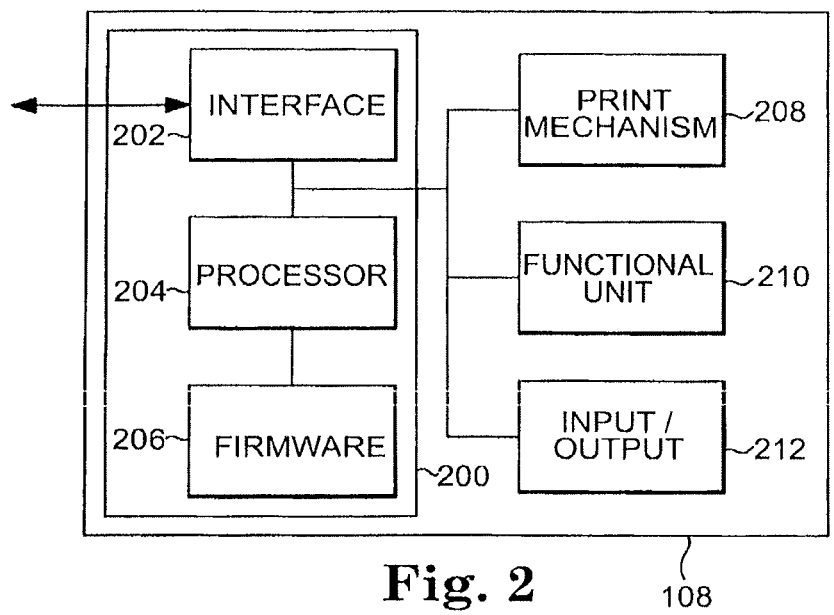
FIG. 2 is a block diagram illustrating an embodiment of a printer with selectable capabilities.

FIG. 2 is a block diagram illustrating an embodiment of printer 108. Printer 108 comprises a print engine 200 that comprises an external interface 202, a processor 204, and firmware 206. Printer 108 also comprises a print mechanism 208, an optional functional unit 210, and an input/output (I/O) device 212.

Printer 108 comprises any type of impact or non-impact printing device configured to transfer text and/or images to paper or another type of media. Types of printing devices include laser printers, inkjet printers, bubble jet printers, thermal printers, and plotters. Printer 108 receives text and/or images from computer system 104 or a print server (not shown) and prints the text and/or images onto a media, e.g., paper, from one or more media trays. Printer 108 may provide status information regarding print jobs to computer system 104 or the print server.

Print engine 200 communicates with computer system 104 or the print server using interface 202 to receive print jobs and causes the print jobs to be printed using print mechanism 208. In the embodiment shown in FIG. 2, print engine comprises processor 204 and firmware 206 to perform these functions. Firmware 206 includes instructions that are executable by processor 204 to cause printer 108 to communicate with computer system 104 or the print server to receive print jobs and provide status information. Firmware 206 also includes instructions that are executable by processor 204 to cause print jobs to be printed by print mechanism 208. In other embodiments, print engine 200 comprises other combinations of hardware and software components configured to perform the functions just described.

Print mechanism 208 comprises any suitable print mechanism configured to print text and/or images onto a paper or another type of media. For example, print mechanism 208 may comprise a laser, inkjet, bubble jet, or impact print mechanism. Print mechanism 208 receives print jobs from print engine 200 and prints the print jobs according to any parameters provided by print engine 200. Print mechanism 208 may include photo printout capabilities to allow a user to print high resolution images onto high quality photo paper.

Printer 108 may include optional functional unit 210. Function unit 210 may comprise a facsimile device and/or a scanner device configured to perform facsimile functions and/or scanner functions, respectively. Facsimile functions include sending and receiving facsimile images. Scanner functions include scanning images into an electronic format and performing processing on the scanned images. Print engine 200 controls the operation of functional unit 210 in response to inputs from computer system 104 or I/O device 212.

I/O device 212 comprises any suitable mechanisms for allowing a user to control the operation of printer 108. Examples of such mechanisms include any combination of buttons, keys, dials, switches, touch-pads, and visual displays. I/O device 212 may provide mechanisms to display a list of capabilities of printer 108, allow a user to select one or more of the capabilities, and receive additional information associated with the selected capabilities.

Printer 108 is configured to provide a user with an ability to select and enable capabilities of printer 108 to meet the user's needs. The capabilities include performance capabilities such as increased print speed, resolution, or image quality, upgrade capabilities such as software or hardware upgrades, functional capabilities such as enabling a facsimile or scanner function, and renewal capabilities such as enabling expired or used-up features. In response to receiving a request for a particular capability from a user, printer 108 may cause payment information associated with the capability to be provided from the user to server 102 prior to enabling the capability in the printer.

Figure 3:
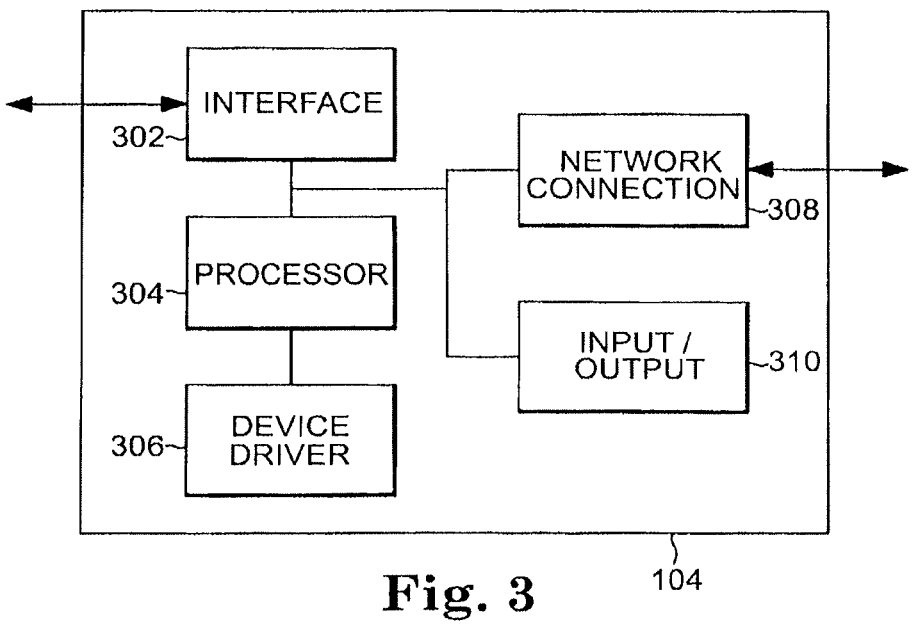
FIG. 3 is a block diagram illustrating an embodiment of a computer system.

In one embodiment, printer 108 operates in conjunction with computer system 104 to provide a user with the ability to select and enable capabilities of printer 108. FIG. 3 is a block diagram illustrating an embodiment of computer system 104. Computer system 104 comprises an interface 302, a processor 304, a device driver 306, a network connection 308, and one or more input/output (I/O) devices 310 such as a computer display, a keyboard, and a mouse. Interface 302 couples to interface 202 of printer 108 to allow computer system 104 to communicate with printer 108. Device driver 306 comprises instructions that are executable by processor 304 to control the operation of printer 108. Device driver 306 causes print jobs generated by computer system 104 or other computer systems (not shown) coupled to computer system 104 to be provided to printer 108 to be printed. Device driver 306 also causes a user interface to be provided to a user of computer system 104 using I/O devices 310 to configure printer 108, manage print jobs, and select capabilities of printer 108 to be enabled. Network connection 308 comprises any suitable communications device that allows computer system 104 to communicate with network 106 and/or other networks (not shown).

To allow a user to select and enable capabilities of printer 108, computer system 104 accesses information including a list of capabilities of printer 108 and provides the information to the user. In one embodiment, computer system 104 accesses the information from server 102. To access the information, computer system 104 may provide information that identifies printer 108 and/or the user to server 102. In other embodiments, the information may be included as part of device driver 306 and/or firmware 206. In these embodiments, computer system 104 accesses the information from device driver 306 and/or firmware 206.

Figure 4:
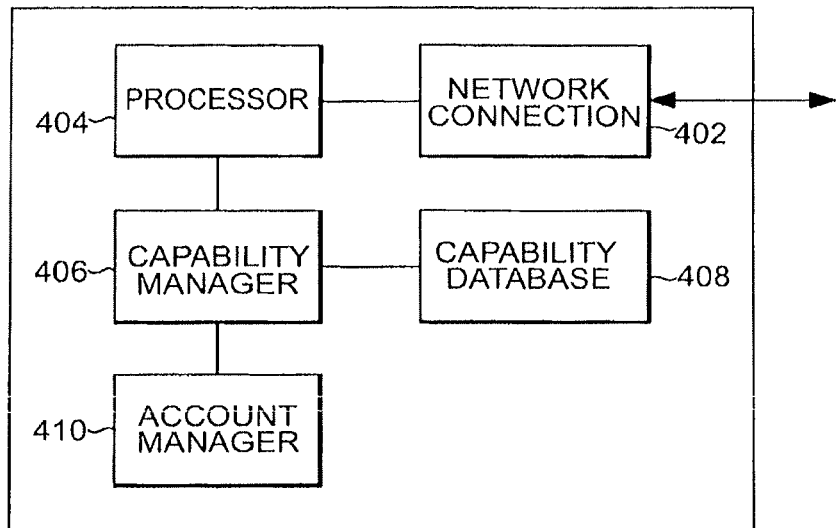
FIG. 4 is a block diagram illustrating an embodiment of a server.

FIG. 4 is a block diagram illustrating an embodiment of server 102. Server 102 comprises a network connection 402, a processor 404, a capability manager 406, a capability database 408, and an account manager 410. Network connection 402 comprises any suitable communications device that allows server 102 to communicate with network 106 and/or other networks (not shown). Capability manager 406 comprises instructions that are executable by processor 404 and/or processor 304 of computer system 104 to cause a list of capabilities for printer 108 to be generated using capability database 408. Capability database 408 comprises information that lists the capabilities that may be enabled for printer 108 and other printers (not shown). Account manager 410 stores user information associated with printer 108. The user information may include a user's name, address, telephone number, e-mail address, and billing or payment information.

Capability manager module 406, capability database 408, and account manager 410 may each be any combination of hardware components and software components that are executable by processor 404, processor 304, or another processor or controller (not shown).

Figure 5:
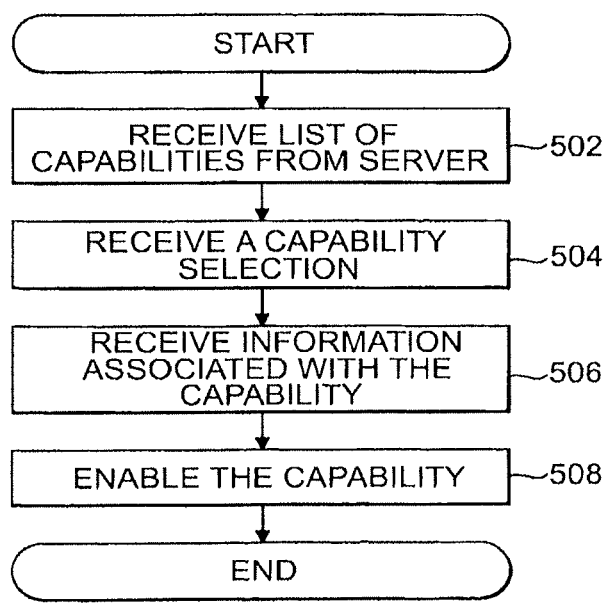
FIG. 5 is a flow chart illustrating an embodiment of a method for selecting capabilities of a printer.

FIG. 5 is a flow chart illustrating an embodiment of a method for selecting and enabling a capability in printer 108 using system 100 shown in FIG. 1. In FIG. 5, a list of capabilities is received by computer system 104 from server 102 as indicated in a block 502. The list is received in response to a request from computer system 104. The request may include information that identifies printer 108 and/or the user. Computer system 104 displays the list to the user using any suitable user interface such as a graphical Internet browser or other graphical interface. The list may include one or more prices associated with each capability.

Printer 108 may be initially provided to a user with a set of enabled capabilities that depend on the price and performance level selected by the user. By selecting and enabling additional capabilities, the performance of printer 108 may be more closely tailored to the needs of the user. As noted above, the capabilities that may be enabled by the user may include performance capabilities, upgrade capabilities, functional capabilities, and renewal capabilities.

Examples of performance capabilities that may be enabled include increased print speeds, increased print resolutions, or increased image quality. By selecting increased print speed, resolution, or image quality, a user may cause printer 108 to print faster, sharper, or of a higher image quality in one or more modes of operation. For example, the user may select to increase print speed and/or resolution for color and/or black and white printing. The user may also select to increase print speed and/or resolution for draft, normal, and/or best modes of operation of printer 108. By enabling increased print speed or resolution, the user causes print engine 200 to operate print mechanism 208 at the increased print speed and/or resolution.

Other examples of performance capabilities that may be enabled are photo image enhancement and paper image optimization. With photo image enhancement, print engine 200 may perform image correction, sharpening, contrast, red eye correction or other photo enhancement features. With paper image optimization, print engine 200 may optimize an image based on the type of media used for printing, e.g., plain paper, photo paper, transparency sheets, or card stock.

Examples of upgrade capabilities include software and hardware upgrades for printer 108. The user may be provided with an ability to upgrade one or more software or hardware components of printer 108 by enabling the upgraded component. For example, upgrades to firmware 206 may be downloaded to provide additional functionality or fix defects.

As another example, upgrades to replaceable hardware components such as print heads or print cartridges may be enabled by the user. The print heads or print cartridges may be provided to the user such that they are inoperable or only partially operable without being enabled. The print heads or cartridges may include one or more types of pens that include different types of ink. The user may be required to enable a capability that allows one or more of the types of pens to be used.

Yet another example of an upgrade capability includes enabling particular media types by enabling one or more media trays of printer 108. Printer 108 may include different media trays for different types of media. Print engine 200 may be configured to print using only enabled media trays. A user may enable other media trays to cause print engine 200 to print to other types of media.

A further example of an upgrade capability includes enabling additional I/O capabilities for communication with devices such as cameras, DVD players, televisions, and video devices that use S-video connections. By enabling upgraded hardware and/or software components, print engine 200 provides a user with the ability to use these upgraded components.

Examples of functional capabilities include enabling facsimile, scanner or photo printout functions. In embodiments where printer 108 includes optional function unit 210, the user may enable facsimile and/or scanner functions or enhancements to existing facsimile or scanner functions. The user may also enable photo printout functions or enhancements to existing photo printout functions in embodiments where print mechanism 208 includes photo printout capabilities. In response to a function being enabled, print engine 200 operates functional unit 210 and/or print mechanism 208 to allow the function to be performed by the user. With facsimile, scanner, and photo printout functions, the user may enable image enhancement, increased speed, and/or increased resolution capabilities. In addition, the user may enable a modem or soft-modem capability for facsimile functions.

Examples of renewal capabilities include enabling expired or used-up license capabilities. Printer 108 may be provided to the user with functions enabled for a limited time (e.g., a trial period) or for a limited number of uses. For example, printer 108 may allow a limited number of printed pages and photos, facsimiles sent and received, and scanned images. Printer engine 200 may track the use of each of these functions. The user may extend or increase these licensed limits by paying for additional time or uses. In response to additional use being enabled, printer engine 200 allows the user to use the functions for the time or number of uses paid for by the user. In some embodiments, only some functions may be offered on a per-use license basis. For example, the user may purchase high resolution scans or high resolution enhanced photo printouts to enable these functions.

Referring back to FIG. 5, the list of capabilities that may be enabled by the user from block 502 may include performance capabilities, upgrade capabilities, functional capabilities, and renewal capabilities as described above. The user may select one or more of the capabilities to be enabled by providing an input to computer system 104. Computer system 104 receives the capability selection from the user as indicated in a block 504. Computer system 104 provides information associated with the capability selection to server 102. The information may include payment information or billing information to cause the user to pay for enabling the selected capabilities. In response to receiving and verifying the information from computer system 104, server 102 provides information associated with the selected capabilities to computer system 104. In response to receiving this information, computer system 104 provides the information to printer 108. Printer 108 enables the selected capabilities using the information as indicated in a block 508. The information from server 102 may include one or more encryption keys configured to enable capabilities of printer 108. The information may also include a firmware update to replace firmware 206 or additional firmware for use in conjunction with the existing firmware 206.

In response to a capability being enabled, print engine 200 allows the user to use the selected capability. In particular, print engine 200 operates print mechanism 208 and functional unit 210 in accordance with one or more indicators associated with one or more capabilities of print mechanism 208 and functional unit 210. In one embodiment, the indicators each comprise an encryption key stored on printer 108. In other embodiments, the indicators may comprise other types of information stored on computer system 104, on server 102, or in other locations.

Print engine 200 determines a state associated with a capability by examining an indicator associated with the capability. Depending on the type of capability, the state may indicate whether the capability is enabled or disabled, or the state may indicate a level of performance associated with the capability. For example, in an embodiment where functional unit 210 comprises a facsimile device, print engine 200 may access an indicator associated with the facsimile device to determine whether the facsimile device is enabled or disabled. The state of the indicator associated with the facsimile device may be changed, e.g., from disabled to enabled, in response to the user enabling the facsimile device as described above. The state of the indicator associated with the facsimile device may also be changed, e.g., from enabled to disabled, in response to a license associated with the facsimile device being used-up or expiring.

As another example, print engine 200 may access an indicator associated with print mechanism 208 to determine the speed or resolution to apply to a print job. The state of the indicator associated with print mechanism 208 may be changed, e.g., from a lower level of performance (e.g., 10 pages per minute) to a higher level of performance (e.g., 20 pages per minute), in response to the user selecting and paying for the higher level of performance as described above. The state of the indicator associated with print mechanism 208 may be changed, e.g., from a higher level of performance to a lower level of performance, in response to a license associated with print mechanism 208 being used-up or expiring.

In another embodiment, print engine 200 performs the functions described above with respect to computer system 104 using I/O device 212. In particular, the I/O device 212 provides the list of capabilities that may be enabled to the user. The user selects capabilities to be enabled and provides payment information using I/O device 212. Print engine 200 provides information associated with the selections and payment information to server 102 using computer system 104 and device driver 306. Print engine 200 receives information associated with the selections and payment information from server 102 using computer system 104 and enables the selected capabilities using the information. Print engine 200 allows the user to use the selected capabilities in response to the selected capabilities being enabled.

Figure 6:
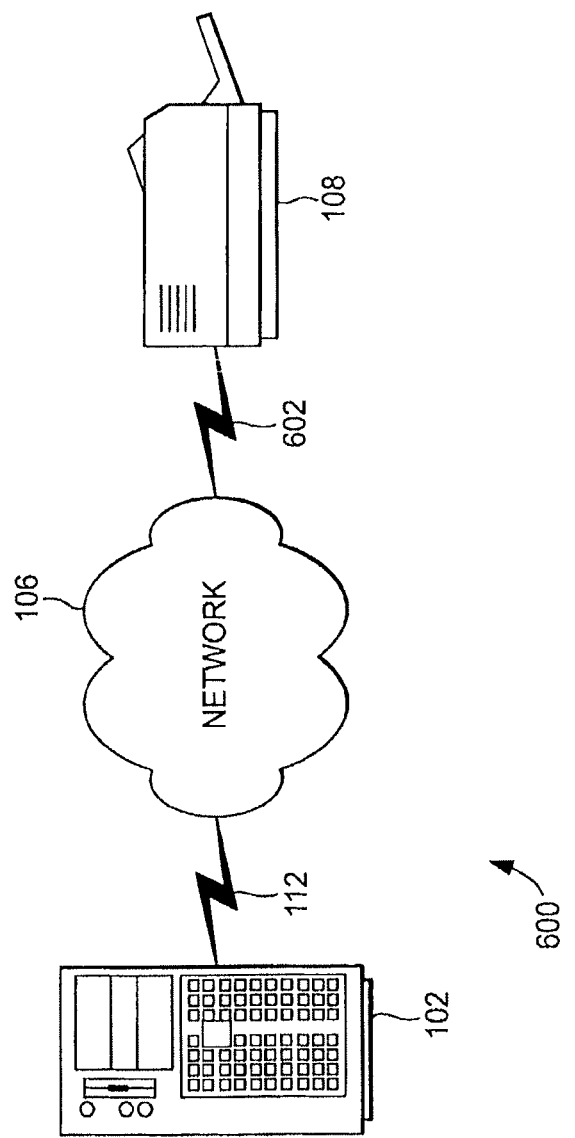
FIG. 6 is diagram illustrating an alternative embodiment of a system that includes a printer with selectable capabilities.

FIG. 6 is a diagram illustrating an alternative embodiment of a system 600 that includes printer 108 with selectable capabilities. In system 600, printer 108 comprises a network device (not shown) configured to communicate with network 106 using a connection 602. Connection 602 may be any suitable wired or wireless connection and may include any number of intermediate connections (not shown).

In the embodiment of FIG. 6, print engine 200 performs the functions described above with respect to computer system 104 using I/O device 212. In particular, the I/O device 212 provides the list of capabilities that may be enabled to the user. The user selects capabilities to be enabled and provides payment information using I/O device 212. Print engine 200 provides information associated with the selections and payment information to server 102 using connection 602. Print engine 200 receives information associated with the selections and payment information from server 102 using connection 602 and enables the selected capabilities using the information. Print engine 200 allows the user to use the selected capabilities in response to the selected capabilities being enabled.

Although various examples of capabilities of printer 108 that may be enabled and/or upgraded by the user have been described above, the enabling and/or upgrading of other capabilities of print mechanism 208 and functional unit 210 of printer 108 are possible and contemplated.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A controller for performing a hardware related process for a printer, the controller comprising:
   at least one interface to first pens of a print cartridge for implementing a first printer related process on a print medium, second pens of the print cartridge for implementing a second printer related process on the print medium, and a memory configured to store a first capability indicator corresponding to the first pens of the print cartridge and a second capability indicator corresponding to the second pens of the print cartridge, wherein the first pens of the print cartridge are configured to be operational according to the first capability indicator being in a second state allowing the first pens of the print cartridge to be operational before a state changing verification, wherein the second pens of the print cartridge are configured to be inoperable according to the second capability indicator being in a first state disabling operation of the second pens of the print cartridge before the state changing verification is received for changing the second capability indicator to a second state enabling operation of the second pens of the print cartridge; wherein the printer comprises the first pens of the print cartridge and the second pens of the print cartridge; and wherein the second pens of the print cartridge are initially configured to be operable on the printer and then subsequently disabled on the printer;
   wherein the controller is configured to:
   control an operation of the first pens of the print cartridge and the second pens of the print cartridge according to the first state and second state of the first capability indicator and the second capability indicator, respectively;
   receive the state changing verification from a server authorizing operation of the previously disabled second pens of the print cartridge; and
   in response to receiving the state changing verification, change the second capability indicator from the first state to the second state, the second state corresponding to the operation of the second pens of the print cartridge being enabled in response to the verification received from the server.

2. The controller of claim 1, wherein the second state enabling operation of the second pens of the print cartridge is set to expire at a time identified in a license.

3. The controller of claim 2, wherein the set expiration time identified in the license corresponds to a trial period.

4. The controller of claim 2, wherein the trial is a predetermined number of uses of the second pens of the print cartridge.

* * * * *